Patented Aug. 24, 1937

2,090,767

UNITED STATES PATENT OFFICE 2,090,767

VIBRATING SCREEN

William W. Sayers, Chicago, Ill., and Harry L. Strube and Willis L. Weisel, Philadelphia, Pa., assignors to Link Belt Company, Chicago, Ill., a corporation of Illinois Application May 21, 1935, Serial No. 22,496

7 Claims. (Cl. 209—326)

This invention is for improvements in the construction of vibrating screens of the type capable of general industrial use, but more particularly adapted for the screening of "rotary mud".

The general object of this invention is to improve in all its details, vibrating screens of this type, to increase their portability, their ruggedness, their compactness, and their efficiency.

These general objects are attained by the successful accomplishment of a large number of subsidiary objects, each of which will become fully apparent from the following detail description when taken in connection with the attached drawings.

This invention resides substantially in the combination, construction, arrangement and relative locations of parts, all as will be described in detail below.

While of general application, the vibrating screen of this invention is more particularly adapted for the screening of "rotary mud", as employed in oil well drilling. The reclamation of "rotary mud" requires an efficient, rugged, vibrating screen for effectively rejecting rock and other lumps of material to give a clean, smooth mud, suitable for re-use in the drilling operations.

The screen of this invention comprises a pair of heavy base angles 2, upon which all of the screen parts are mounted and providing a base which in turn may be mounted upon heavy timbers or a concrete foundation of suitable form and construction as indicated at 1 in the drawings. By this arrangement a complete unitary and portable screen is provided which is strong enough to withstand transportation strains or shocks, and as a result the screen may be easily set up at the place of use.

Extending transversely between the base angles 2, which extend longitudinally of the completed screen at the sides thereof are the transverse angles 3, 4, which are welded or otherwise secured to the side angles 2 to form a rigid base frame. The transverse angle 4' is removably secured in place so that it can be shifted to the other end of the frame when the power unit is mounted at that end. At 5 is a base for the power unit 6, which in this case has been illustrated as a steam turbine. It is to be noted that the turbine is illustrated for the purpose of showing its location and mounting as part of the complete screen unit. Any other suitable form of power source may be employed. Welded or otherwise secured to the side or base angles 2, intermediate the ends thereof, are the heavy pedestals 7. The tops of these pedestals have been illustrated as having an inclination to the horizontal. Attached to the inclined tops of the pedestals, by means of the bolts 8, are the compound leaf springs 9 which terminate in coiled ends 10.

Figures 3, 4, 5:
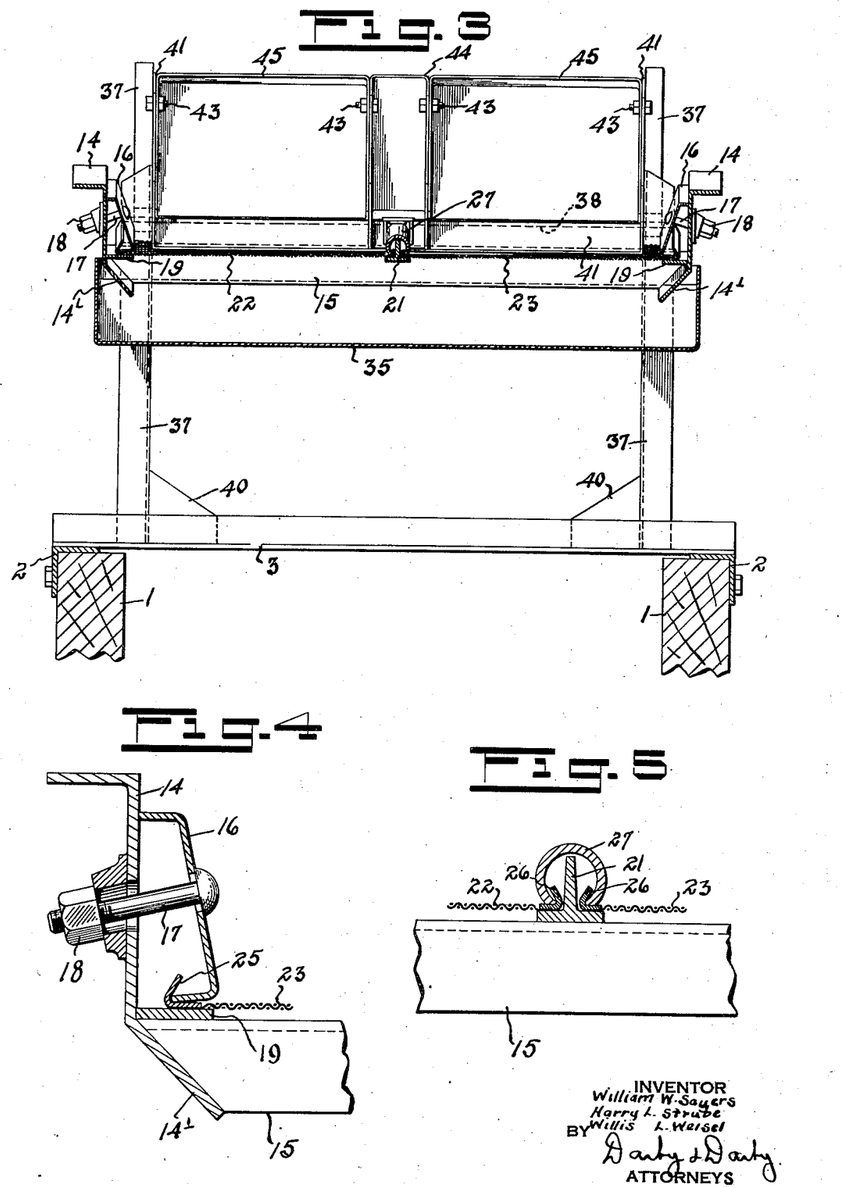
Fig. 3 is a cross sectional view taken on the line 3—3 of Figure 1.
Fig. 4 is a cross sectional view through one of the side plates of the screen box at one of the clamping bolts for the side channel by means of which the screen cloth is transversely tensioned along one side thereof.
Fig. 5 is a cross sectional view through the center bar showing how the screen cloths of which two are employed with the structure herein disclosed are clamped.

The screen box proper consists of a pair of side plates 14, the cross sectional shape of which is clear from Fig. 4. These side plates consist of a central vertical portion terminating at the top in a right angled flange portion and at the bottom in an inclined portion 14' extending from the central portion in a direction opposite to the flange. Extending between the side plates from the inclined portions 14' are the angle bars 15, which are welded at their ends to the side plates.

Figure 18:
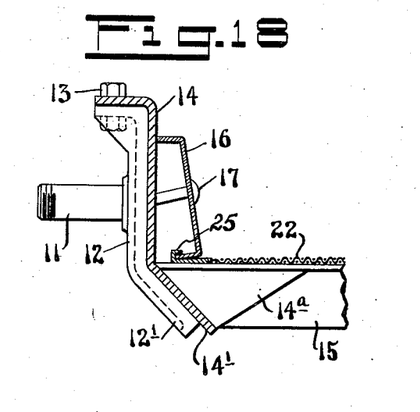
Fig. 18 is a cross sectional view through one of the side plates of the screen box just in front of one of the spring brackets.

If desired, and as illustrated in Fig. 18, additional strength may be imparted to the screen box at this point by welding in place the gusset plates 14ª. Extending along the sides of the screen box thus formed are the U channels 16, which are held to the side plates at intervals by means of bolts 17 and nuts 18. The channels are so shaped that they fulcrum along the top edge against the side plate, while the other edge engages with a binder 25 secured to the outer edges of both the screen cloths 22 and 23. Extending longitudinally of the screen box are the stringers 19 which rest upon the tops of the angle bars 15, and are in a position so that the channels 16 of the screen cloths, which are usually of wire, may rest thereon. As illustrated in Fig. 18, the stringers 19 may be omitted and the binders 25 then rest directly on the angle bars 15.

As will be clear from Fig. 4, as the nuts 18 are tightened the outer edges of the screen cloths will be drawn towards the side plates, and as the screen cloths are anchored at their other edges they will be tensioned.

Figure 2:
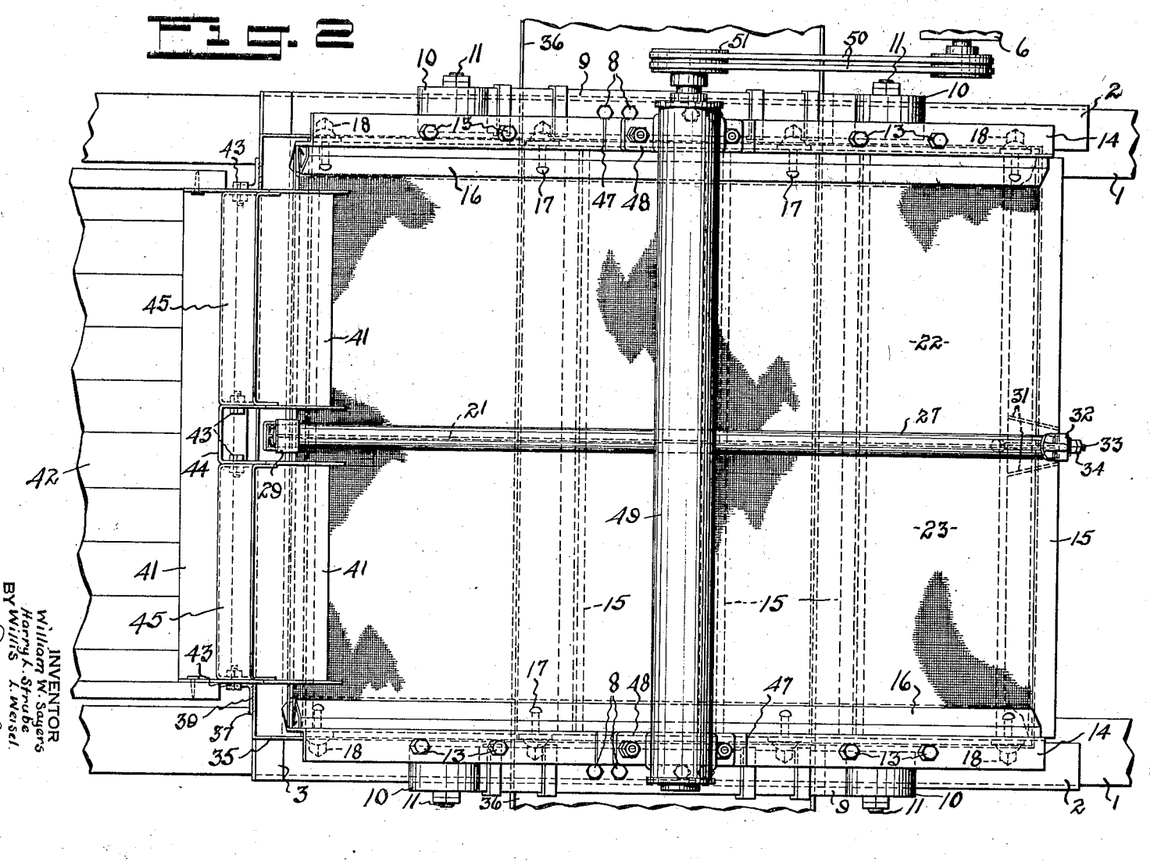
Fig. 2 is a top plan view thereof.

As is clear from Fig. 2, the structure in accordance with this invention preferably, but not necessarily, employs two distinct and individual screening cloths. The adjacent edges of these cloths, as illustrated in Fig. 5, are provided with binders 26, similar to the binders 25 at their other edges, by means of which the cloths may be tensioned. A T-bar 21 is welded to cross angles 15 and positioned with its central web vertical.

The binders 26 rest upon this T-bar on opposite sides of the web and are engaged by a channel 27 of substantially circular cross section which has been longitudinally slotted as is clear from Fig. 5. This channel 27 may, for example, be made from a piece of pipe which has been longitudinally slotted to provide sufficient space at the slot so that it may fit over the web of the T-bar 21, and engage the binders 26. In the form illustrated in Fig. 5 the channel 27 which may be termed a clamping bar, may be slid longitudinally into place. When locked in place the two screen cloths 22 and 23 may be properly tensioned by means of the side channels 16, bolts 17, and nuts 18.

Figure 6:
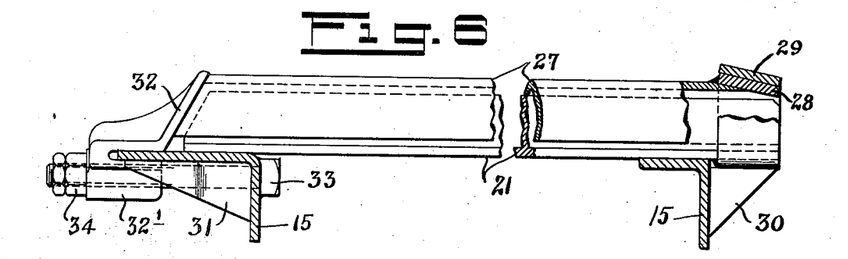
Fig. 6 is a side elevational view with some parts in cross section of one form of center bar and the fastening means therefor.
Figure 7:
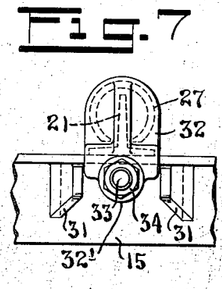
Fig. 7 is a left hand end elevational view thereof.
Figure 8:
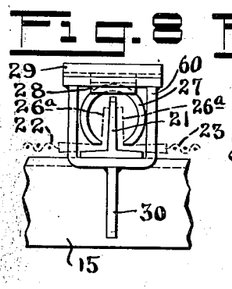
Fig. 8 is a right hand elevational view thereof.

The center or clamping bar 27 may be secured in place in many different ways. A preferred form of locking structure is illustrated in Figs. 6, 7, and 8. At one end of the channel 27 at the top the surface is cut away on a bevel, as is clear from Fig. 6, and has welded thereto a small bar or plate 28.

Secured to the uppermost cross brace or angle 15 is a yoke 29, the upper surface of which is inclined to form a cooperating seat for the plate 28. The yoke 29 is secured to the cross brace 15 by welding and is further braced by means of a gusset plate 30 which is welded both to the cross brace and to the yoke.

At this point it may be noted, as illustrated in Fig. 8, that the binders on the adjacent sides of the screens 22 and 23 may be L-shaped, as indicated at 26ª, to permit of an easier application of the clamping bar 27 than would be the case of the arrangement of Fig. 5. The other end of the clamping bar 27 is cut off at an acute angle to the longitudinal axis of the bar to engage with the inclined face of the clamp 32. This clamp is provided with a boss 32' which has a hole therethrough. The clamp slidably fits over one leg of the adjacent cross angle 15. A bolt 33 passes through this angle 15 to which it is welded and the boss 32' and is provided with the tightening nuts 34. The cross angle 15 is strengthened at this point by a pair of gusset guide plates 31 which are welded in place on opposite sides of the clamp 32. It will be clear from Fig. 6 how the clamping bar 27 is secured in place. The right hand end of bar 27 is slipped into the yoke 29. Clamp 32 is then slipped onto the end of bolt 33, so that its inclined face engages the inclined end of bar 27. The nuts 34 are applied to the bolt 33 and as they are driven home the clamping bar moves longitudinally into yoke 29 and transversely towards the screen securely anchoring the screen cloth along its center. The inclined faces of the clamp 32 and yoke 29, cooperating with the adjacent ends of the clamping bar, effect these movements of the clamping bar as it is locked in place.

Figures 9, 10:
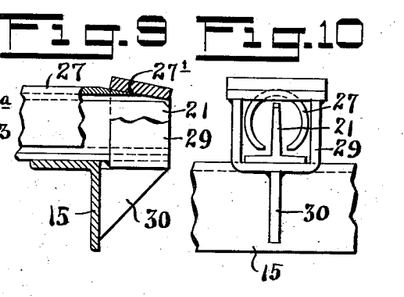
Fig. 9 is a side elevational view with some parts in cross section of the modified form of structure for the right hand end of the clamping bolt.
Fig. 10 is an end elevational view thereof.

At this point it is desirable to note the modified forms of structure for securing the clamping bar 27 in place. In the modification of Figs. 9 and 10 the only difference to be noted is that the plate 28 is omitted and the inclined or tapered upper end 27' of the channel 27 bears directly against the top of the yoke 29.

The manner in which the screen box is supported from the main pedestals 7 and the leaf springs 9 will now be explained. Secured to the side plates on the upper faces and towards each end thereof are the spring brackets 12. The construction of these brackets is more clearly seen from Fig. 18. They consist of a vertical central portion, a top right angled portion, and a lower inclined portion 12'. In other words, these spring brackets are shaped to fit snugly against the outer faces of the side plates and are secured thereto at the top by means of the bolts 13. These heavy spring brackets serve to greatly strengthen the entire screen box.

It will be noted, as can be seen from the figures, that some of the cross angles 15 are welded to the side plates opposite the spring brackets and particularly adjacent the inclined portion 12' which is welded to side plate 14. This arrangement, in combination with the gusset plates 14ª welded in place, imparts still greater strength to the screen box which is of extremely rugged construction and capable of resisting strains and stresses in all directions.

The spring brackets are provided with threaded studs 11 which pass through the center of the coiled ends 10 of the leaf springs and are provided with nuts by means of which the springs are locked thereto. It will now be clear how the screen box itself is supported so that it may vibrate. At 35 is shown the collecting hopper which collects the material, such as the mud, passing through the screen cloths. This hopper extends between the main pedestals 7 and is welded thereto. Its upper edges extend parallel to the screen box and its sides extend downwardly parallel to the pedestals. The bottom portions on opposite sides of the pedestal converge and terminate at the pedestals in a trough 36 which emerges from each side of the structure through openings in the webs 7' of the pedestals. Although not shown, if desired the trough may be closed at either side to direct the discharge of mud from either side of the screen, or from both sides, if desired. The trough 36 extends between the base angles 2 and pedestals 7 to which it is welded, as well as to the hopper 35. This insures greater stiffness in the entire frame.

Extending upwardly near the ends of the cross angle 3 are a pair of angles 37 which are welded at the lower ends to the cross angle 3. Extending between the vertical angles 37 and below the upper ends is another angle 38 which is welded at its ends to the vertical angle 37. The upper end of the hopper 35 is welded to the vertical angles 37, as indicated at 39.

It will be seen that the hopper is tied in to the various parts of the structure and particularly to the supporting framework so as to rigidly support it, and to interconnect all of the framework parts to make an extremely compact and strong structure. In other words, the hopper 35, which is inherently strong in itself, interconnects the pedestals and base, further strengthening them, and is tied in to the vertical angles 37 to provide an arrangement which is easily portable without damage thereto. The upper end of the hopper 35 extends, as is clear from Fig. 1, a short distance beyond the upper end of the screen box, so that any material that may travel upwardly and spill over the upper end of the screen box will be caught by the hopper and discharged by the trough 36.

This arrangement of the hopper greatly reduces the overall height of the structure which is an important feature for rotary mud screens where the head room in the field of use is often at a minimum. The provision of a central discharge for the screened material has a desirable advantage. The placement of the hopper close to the screen cloth and its form reduces aeration of the mud which is of practical importance. This feature is also contributed to by the accurate positioning of the discharge chute 41 as will appear below. With the screen design of the invention, the greater portion of the mud passes through the upper end of the screen and therefore has a relatively short distance to drop to the inclined bottom plate of the hopper 35.

Figure 1:
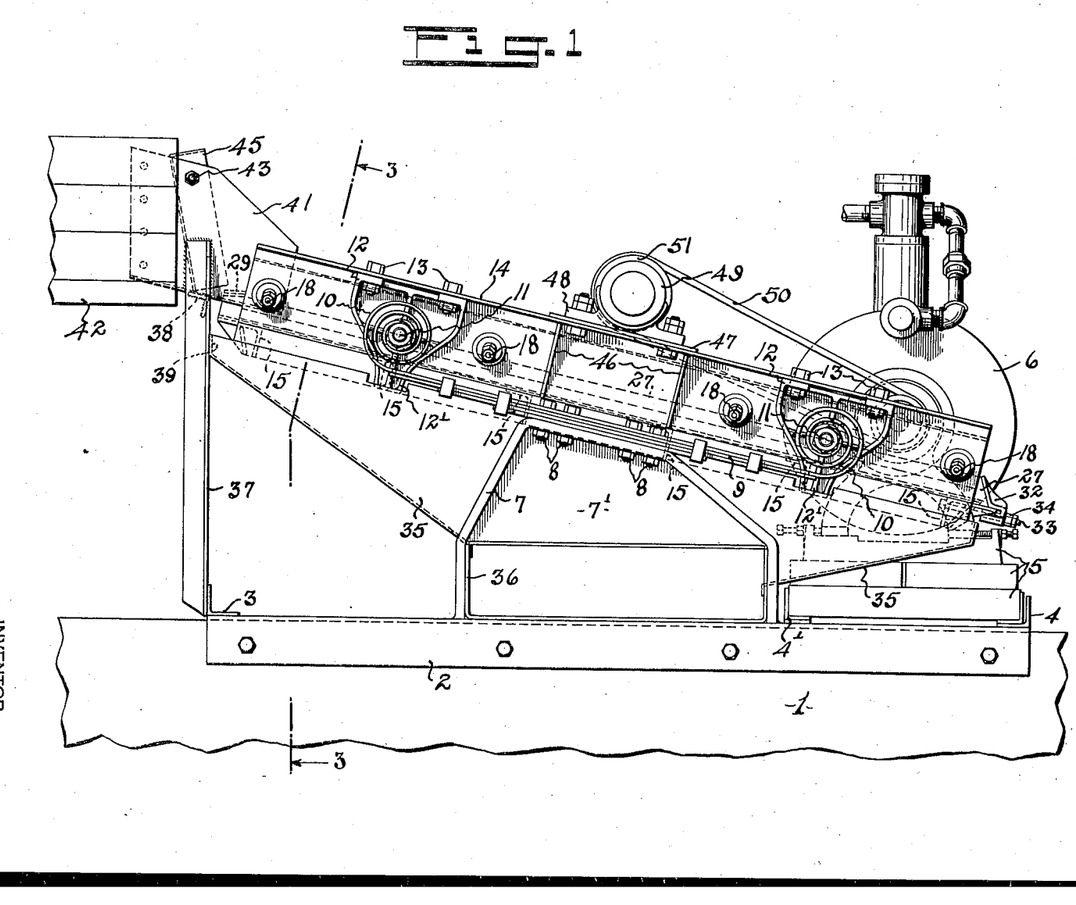
Figure 1 is a side elevational view of the complete screen of this invention.

At 41 is the discharge chute by means of which the material to be screened is directed onto the cloths. This chute is mounted between the vertical angle 37 and is welded thereto, as indicated in Fig. 1, and also rests upon the cross angles 38 to which it is also welded. At 42 is shown a wooden sluice way which forms no part of this invention, but which is shown to illustrate the manner in which the material to be screened is conducted to the screen. The mounting of the chute illustrates an important feature of this invention comprising the accurate positioning of the chute 41 to which the sluice way 42 must be brought and attached. This insures that the chute discharges the material onto the screen cloths from the proper height so as not to damage the cloths. At the center of the chute is a vertical partition or dividing wall 44, which inclines backwardly towards the left of the chute (Fig. 1), and which is secured thereto by welding or being made an integral part of the chute. This partition is positioned, as is shown from Fig. 3, so that the material being discharged from the chute is directed onto each screen cloth when two cloths are used, but is cut off from discharge directly onto the center bar clamping bar 27. Pivotally mounted at 43 between the sides of the chute and the partition 44 are the individually adjustable gates 45 which likewise, when fully closed, incline towards the left of the chute (see Fig. 1).

This arrangement also constitutes an important feature of the invention and adapts the device to varying operating conditions which must be met by a practical screen of this type.

In the case of rotary mud when the mud is being fed to the screen at a slow rate, which occurs when drilling takes place in rock, for example, it is preferable to use only one side of the screen. Where a small amount of material is being delivered to the screen if it is fed to both sides there is a tendency for the screen cloth to clog up so that the screen does not work efficiently when the mud is being fed thereto at higher rates. With the two mud chute structure illustrated, one side may be closed off when a small amount of material is being delivered to the screen and each side may be used alternately, thereby equalizing the wear on the cloths. The construction and positioning of the central partition prevents the material from backing up and interfering with the correct operation.

Furthermore, as mentioned above, the central clamping bar is protected from the direct discharge of material thereonto, which of course is desirable. The gate openings may be adjusted to insure the proper delivery of the material to the screen for different rates of feed. It is also again noted for emphasis that by mounting the chute directly on the screen box supporting frame it is accurately positioned above the screen cloth and overlaps the upper ends of the screen cloths the proper distance.

As will be noted from Fig. 3, the vertical angles 37 may be further braced by means of the gusset plates 40. which are welded both to the cross angles 3 and the vertical angles 37 to further strengthen the entire structure.

Figures 11, 12, 13:
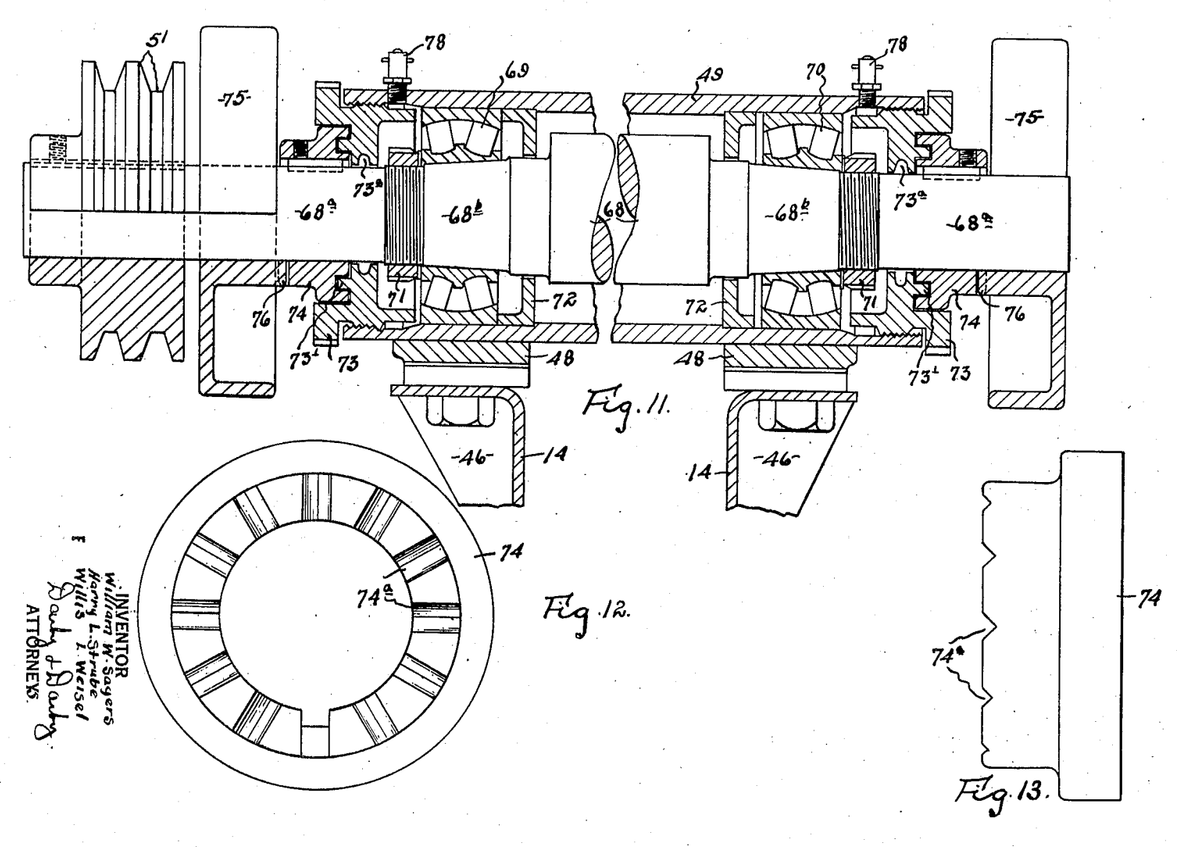
Fig. 11 is a longitudinal, central, cross sectional view through the unbalanced shaft and housing therefor showing the counter-balancing weights.
Fig. 12 is a front elevational view of one of the dust seal plates showing the indexing notches thereon for positioning the counter-balancing weights.
Fig. 13 is a side elevational view thereof.

The mechanism for vibrating the screen, and its adjuncts, will now be reviewed. The side plates 14 are braced by means of the stiffeners 46 which are welded thereto and to the top flange as is clear from Figs. 1 and 11. Bolted to the top flange of the side plates between the stiffeners 46 are the supporting brackets 48 for the vibrator unit, the housing 49 of which is welded to these brackets. The housing further braces the screen box and eliminates the need of cross braces at the top of the box. The construction of this unit is shown in Fig. 11, as preferably employed for general industrial use. This will be clear as the description proceeds. The housing 49 for the unit consists of a steel tube which is welded near its ends to the brackets 48. The pipe is internally threaded at the ends to receive the closure plates 73. Within the housing are a pair of roller bearings 69 and 70. The inner movable races of the roller bearings are locked upon the tapered portions 68' of the vibrator shaft by means of the lock nuts 71 which threadedly engage the shaft. The central portion 68 of this shaft is eccentric or unbalanced with respect to the axis of rotation of the terminal portions 68ª. This unbalanced portion is located between the discs 72 which substantially isolate the bearings from the central portion, and enclose them within chambers formed by the discs 72 and the closure members 73. These chambers may be supplied with the necessary lubricant through the grease fittings

78. The entire chamber formed by the tubular housing 49 and the closure members 73 is further sealed against the entrance of dirt and foreign material by means of the dust seals 74. These consist of substantially disc shaped members which are keyed to the ends 68ᵃ of the shaft, as is clear from Fig. 16, and are each provided with an annular groove in which the annular rib 73' on each of the closure members fits with slight clearance. The central aperture in the closure member is provided with an annular groove 73ᵃ in which felt or other suitable packing material may be placed to further prevent the passage of dirt.

By this construction it will be apparent that the roller bearings are for all practical purposes substantially isolated and protected against the entry of dirt and dust.

Figures 14, 15, 17:
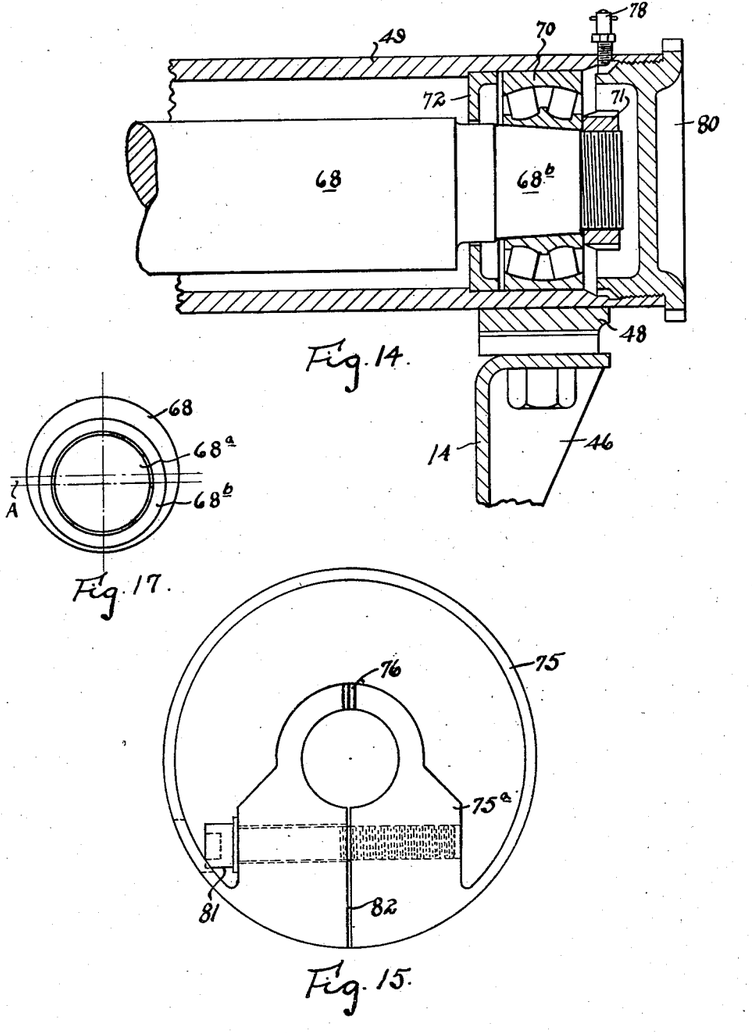
Fig. 14 is a longitudinal, vertical, central cross sectional view through one end of the unbalanced shaft, and the housing therefor showing the structure employed for industrial screens where the counter-balancing weights are not employed.
Fig. 15 is a front elevational view of one of the counter-balancing weights.
Fig. 17 is an end elevational view of the unbalanced shaft showing the eccentricity of the unbalanced portion.

On one end of the shaft is mounted a drive pulley 51, which is connected by means of the belts 50 to the pulley of the turbine 6 (see Figs. 1 and 2). When the screen is used for salvaging rotary mud the counterweights which are about to be described are omitted and the right hand end of the shaft terminates within the tubular housing 49, as illustrated in Fig. 14. In this case the right hand dust seal 74 is omitted and a modified form of closure member, as illustrated at 80, completely seals the right hand end of the tubular housing. With this arrangement the only possible point of entry for dust and dirt is at the pulley end of the shaft.

The vibrator unit for the treatment of rotary mud or any other single material where the vibratory forces required are known, does not employ unbalancing or counterbalancing weights other than the eccentric or unbalanced arrangement of the shaft itself. With this arrangement where the forces which cause vibration may remain substantially fixed, they are secured by the unbalanced central portion 68 of the shaft (see Fig. 17). This is a novel feature of construction in this art since it is usual to provide unbalancing weights mounted on a shaft which rotates on its own axis. Where unbalancing weights are employed it is common to make them either adjustable or to use counterbalancing weights, so as to set up vibrations of the desired intensity. Obviously such arrangements involve two separate functions, one for unbalancing the shaft, and one for adjusting the amount of unbalance, and are more complicated than the simple arrangement of this invention where the shaft itself is so constructed as to provide an unbalance of known and desired intensity. It is likewise much simpler than many other more complicated arrangements which have heretofore been employed in this art.

In these cases where the screen is to be of general application there is provided in connection with the unbalanced shaft a pair of counterbalancing weights which are angularly adjustable on the shaft to either add to or subtract from the vibrations imparted by the unbalanced shaft itself.

Figure 16:
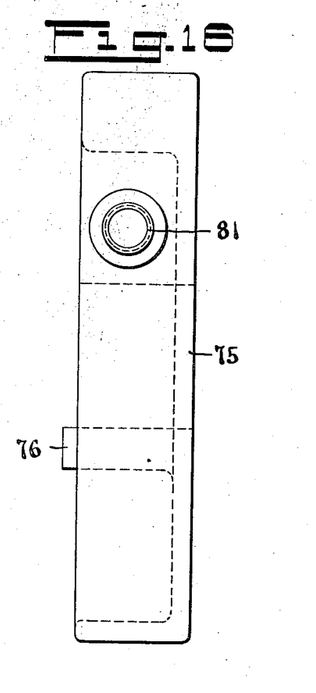
Fig. 16 is a side elevational view of the counter-balancing weight.

The construction of the weights in accordance with this invention is illustrated in Figs. 15 and 16. They comprise the shell like members 75 which have the weighted portion 75ᵃ. The disc or shell is slotted at 82 from the periphery to the central bore and a threaded bolt 81 interconnects the portion of the disc at the slot so that it may be readily clamped on the portions 68ᵃ of the shaft in any desired angular position. The hub is provided with a projecting lug 76 which cooperates with radial slots 74ᵃ on the face of the dust seal 74. These dust seals, as is clear from Fig. 11, are keyed in alignment to the shaft in a fixed angular position with respect to the unbalanced portion 68 of the shaft. The discs 75 may therefore be angularly adjusted with respect to the unbalanced portion of the shaft by the cooperation of the indexing lug 76 thereon with the various radial slots 74 on the dust seal. When angularly adjusted with the indexing lug in one of the slots the bolt 81 is tightened to lock the weights on the shaft. A pair of these weights are preferably employed, as illustrated in Fig. 11, one at each end of the shaft, so as not to impart any whipping action such as would occur if only one of the weights is employed. With this arrangement the screen is adapted for general application where vibrations of different intensities may be necessary. The weighted portions of the discs may be positioned with respect to the unbalanced portion 68 of the shaft so as to either add or subtract from the intensity of vibration imparted to the screen by the unbalanced portion 68 of the shaft. This provides an exceedingly simple and yet inexpensive arrangement whereby a screen may be given a variable intensity of vibration. It also eliminates the necessity of multiple counterweights detachably secured in place in accordance with common methods of adjusting the intensity of vibration of such devices.

If desired, and for the purpose of increasing the life of the screen cloth, some form of buffer or resilient member may be interposed between each cross angle 15 and the screen cloth. A suitable form of resilient member for this purpose is disclosed in the patent to Edwin C. Berghoefer No. 1,932,920, dated October 31, 1933, for "Fine mesh screen box". A particular advantage of this form of resilient member in a rotary mud screen is found in the wiping action which occurs because of the relative movement between the screen cloth and the resilient members. Without such an arrangement there is a tendency for the more fluid parts of the material to run downwardly along the undersurface of the screen cloth unless a device of this type is employed.

From the above description it will be apparent that this invention involves a number of novel features of construction, all of which are combined to provide a highly rigid, rugged, and efficient vibrating screen of a type adapted to general industrial application, as well as to the special application of reclaiming rotary mud. It will be apparent to those skilled in the art that these various novel features of construction may be used either singly or in various combinations, and we do not therefore desire to be strictly limited to the disclosure as given for purposes of illustration, but rather to the scope of the appended claims.

What we seek to secure by United States Letters Patent is:

1. In a vibrating screen of the type described the combination comprising a supporting base, pedestals mounted on the base, a screen box comprising a pair of side plates having straight central portions terminating at one edge in an outturned flat flange portion and at the other edge in an offset integral portion, transverse bracing members extending between the side plates and secured on their ends to the offset portions of the side plates, spring means for resiliently securing said side plates to said pedestals, means bolted to the flange portions of the side plates for vibrating the screen box, a pair of screen cloths, means extending longitudinally of the screen box for clamping the adjacent edges of the screen cloths, means mounted on the side plates for clamping the outer edges of the screen cloths and tensioning them.

2. In a vibrating screen of the type described the combination comprising a supporting base, pedestals mounted on the base, a screen box comprising a pair of side plates having straight central portions terminating at one edge in a flat flange portion and at the other edge in an offset portion, transverse bracing members extending between the side plates and secured on their ends to the offset portions of the side plates, spring means for resiliently securing said side plates to said pedestals, means bolted to the flange portions of the side plates for vibrating the screen box, a pair of screen cloths, means extending longitudinally of the screen box for clamping the adjacent edges of the screen cloths, means mounted on the side plates for clamping the outer edges of the screen cloths and tensioning them, and a trough mounted below said screen box and secured to said pedestals.

3. A vibrator unit for vibrating screen comprising a tubular housing, a pair of journal bearings mounted in said housing, a shaft having an unbalanced portion mounted in said journal bearings, closure caps for the ends of said housing through which said shaft extends, a pair of angularly adjustable counterweights mounted on the projecting ends of said shaft and cooperating means on the adjacent faces of the counterweights and the closure caps for angularly indexing the counterweights.

4. A vibrator unit of the type described comprising a tubular housing, a pair of journal bearings mounted in said housing, a shaft having an integral unbalanced portion supported in said bearings, a pair of closure caps for the ends of said housing through which the ends of the shaft project, a pair of dust seals mounted on the projecting ends of said shaft and cooperating with said closure caps, a pair of counterweights mounted on the projecting ends of said shaft, and cooperating indexing means for determining the angular position of the counterweights with respect to the unbalanced portion of the shaft formed on the adjacent faces of the counterweights and dust seals.

5. A vibrator unit of the type described comprising a housing, an unbalanced shaft journaled in said housing, closure caps for the ends of said housing through which the ends of the shaft project, angularly adjustable counterweights secured to the projecting ends of said shafts, said counterweights having lugs, indexing means mounted on said shaft for cooperation with said lugs, said counterweights consisting of unbalanced discs having central bores through which the shaft passes and being radially slotted from the central bore to the periphery, and a bolt mounted in the discs and extending across the slots to permit locking of the discs on the shaft in any desired angular position.

6. In a vibrating screen the combination with a base, springs secured on said base, and a screen box mounted on and secured to said springs, of a vibrator unit mounted wholly and freely on said box comprising a closed housing, a shaft journaled in said housing having an integral unbalanced portion for causing vibration of said box when said shaft is rotated, said shaft projecting from both ends of the housing, means for forming a seal between projecting ends of the shaft and the housing, and a pair of adjustable counterweights mounted on the respective projecting ends of the shaft to modify the intensity of vibration of the screen box caused by the rotation of the unbalanced shaft.

7. A vibrator unit of the type described comprising a tubular housing, a shaft rotatably mounted in the housing having an integral unbalanced portion, closure members for both ends of the housing through which the ends of the shaft project, means mounted on each of the projecting ends of the shaft and nesting with the adjacent closure members to form seals for the housing at the point of emergence of the shaft ends, a pair of adjustable counterweights mounted on the projecting ends of the shafts and having indexing means for cooperating with said sealing means to indicate and aid in determining the relative angular position of the counterweights with respect to the unbalanced portion of the shaft.

WILLIAM W. SAYERS.
HARRY L. STRUBE.
WILLIS L. WEISEL.